United States Patent [19]

Yanagisawa et al.

[11] Patent Number: 5,220,555

[45] Date of Patent: * Jun. 15, 1993

[54] SCANNING TUNNEL-CURRENT-DETECTING DEVICE AND METHOD FOR DETECTING TUNNEL CURRENT AND SCANNING TUNNELLING MICROSCOPE AND RECORDING/REPRODUCING DEVICE USING THEREOF

[75] Inventors: Yoshihiro Yanagisawa, Atsugi; Kunihiro Sakai, Isehara; Hisaaki Kawade, Atsugi, all of Japan

[73] Assignee: Canon Kabushiki Kaisha, Tokyo, Japan

[*] Notice: The portion of the term of this patent subsequent to Apr. 21, 2009 has been disclaimed.

[21] Appl. No.: 783,790

[22] Filed: Oct. 29, 1991

Related U.S. Application Data

[63] Continuation of Ser. No. 413,194, Sep. 27, 1989, Pat. No. 5,107,112.

[30] Foreign Application Priority Data

Sep. 30, 1988 [JP] Japan ................. 63-244590
Sep. 25, 1989 [JP] Japan ................. 1-246427

[51] Int. Cl.$^5$ ............................. H01J 37/00
[52] U.S. Cl. ..................... 369/126; 369/101; 250/307
[58] Field of Search .............. 250/306, 307; 369/101, 369/126

[56] References Cited

U.S. PATENT DOCUMENTS

| | | | |
|---|---|---|---|
| 4,481,616 | 11/1987 | Matey | 369/126 |
| 4,668,865 | 5/1987 | Gimgewski et al. | 250/306 |
| 4,831,614 | 5/1989 | Ducrig et al. | 369/101 |
| 5,015,850 | 5/1991 | Zedeblick | 369/126 |
| 5,043,577 | 8/1991 | Pohl | 250/306 |
| 5,047,633 | 9/1991 | Finlan et al. | 250/306 |

FOREIGN PATENT DOCUMENTS

| | | | |
|---|---|---|---|
| 194323 | 9/1986 | European Pat. Off. | 250/306 |
| 0262253 | 4/1988 | European Pat. Off. | |
| 3513799 | 4/1986 | Fed. Rep. of Germany | |
| 8804028 | 6/1988 | PCT Int'l Appl. | |

OTHER PUBLICATIONS

"High-Stability Bimorph Scanning Tunneling Microscope", Blackford et al., *Rev. of Sci Inst.* vol. 58 No. 8 Aug. 1987, pp. 1343-1348.

"Scanning Tunneling Microscopy" G. Binnig et al., *Helvatica Physica*, vol. 55, pp. 726-735.

*Primary Examiner*—Bruce C. Anderson
*Attorney, Agent, or Firm*—Fitzpatrick, Cella, Harper & Scinto

[57] ABSTRACT

A scanning tunnel-current-detecting device comprising at least two probe electrodes supported by a supporting member, a means for placing a sample in proximity to the probe electrodes, a means for applying voltage between the probe electrodes and the sample, at least one of the probe electrodes being provided with a mechanism for measuring and compensating variation of the distance between the supporting member and the sample, is provided.

44 Claims, 1 Drawing Sheet

SCANNING TUNNEL-CURRENT-DETECTING DEVICE AND METHOD FOR DETECTING TUNNEL CURRENT AND SCANNING TUNNELLING MICROSCOPE AND RECORDING/REPRODUCING DEVICE USING THEREOF

This application is a continuation of application Ser. No. 07/413,194 filed Sep. 27, 1989, now U.S. Pat. No. 5,107,112.

BACKGROUND OF THE INVENTION

1. Field of the Invention

The present invention relates to a scanning tunnel-current-detecting device comprising a mechanism for canceling variations caused by thermal drifts and mechanical vibration, and a method for detecting a tunnel current and to a scanning tunnelling microscope and a recording/reproducing device utilizing a method for detecting tunnel current.

2. Related Background Art

Recently a scanning tunnelling microscope (hereinafter referred to as STM) has been developed [G. Binnig et al., Helvetica Physica Acta, 55, 726 (1982)] which enables direct observation of electronic structure of the atoms on the surface of a conductor, and allows a measurement of an image of real space of not only a single crystal but also an amorphous material with high resolution. This measurement has an advantage that an observation can be made with low electric power without impairing a medium by a current. Moreover, this measurement can be conducted in an atmospheric environment and is applicable to various materials, so that the method is promising in a variety of technical applications.

The STM utilizes a tunnel current which flows between a metallic probe (or a probe electrode) and an electroconductive material (or a sample) when an electric voltage is applied therebetween and the both are brought into proximity as close as approximately 1 nm to each other. This current is extremely sensitive to the change of the distance between the probe electrode and the sample, so that the scanning with a probe at a constant tunnel current allows depiction of the surface structure of the real space and simultaneously gives various informations regarding the whole electronic clouds of surface atoms.

To the STM for this purpose, a vibration isolator is indispensable which reduces external disturbances caused by floor vibration, and a minute deformation of constituting material caused by ambient temperature variation to less than a resolution limit.

Generally, for eliminating the influence of vibration, passive measures are taken such as a method of reducing vibration by dissipating a vibration energy with a damper element of a dynamic vibration isolator, and a method of lowering resonance frequency by employing a relatively massive body as the supporter or the stand to increase a resistance to vibration.

Not so serious problem is encountered thereby in observation of a local atomic arrangement of a sample by locally scanning a probe electrode of STM. However, in observation of the surface state of a sample over a relatively large area by scanning a probe electrode of STM for a long time, there arises a problem that an influence of temperature drift caused by a thermal contraction or expansion of the member constituting STM and the sample to be measured become significant, and lowering the measurement precision ensues. The variation caused by the temperature drift may sometimes reach approximately 0.5 $\mu$m (in the Z direction).

SUMMARY OF THE INVENTION

An object of the present invention is to provide a scanning tunnel-current-detecting device and a method for detecting the tunnel current which are highly precise and free from the disadvantages of the prior art and from the influence of a temperature drift caused by long time of probe electrode scanning.

Another object of the present invention is to provide a scanning tunnelling microscope and a recording/reproducing device which cause little measurement error even when it is used for long time of measurement, and a method for detecting a tunnel current.

The above objects are achieved by the present invention.

According to an aspect of the present invention, there is provided a scanning tunnel-current-detecting device comprising at least two probe electrodes supported by a supporting member, a means for placing a sample in proximity to the probe electrode, a means for applying voltage between the probe electrode and the sample, at least one of the probe electrode being provided with a mechanism for measuring and compensating variation of the distance between the supporting member and the sample.

According to an another aspect of the present invention, there is provided a scanning tunnelling microscope comprising at least two probe electrodes supported by a supporting member, a means for placing a sample in proximity to the probe electrode, a means for applying voltage between the probe electrode and the sample, at least one of the probe electrode being provided with a mechanism for measuring and compensating variation of the distance between the supporting member and the sample.

According to a further aspect of the present invention, there is provided a method for detecting a tunnel current comprising employing at least two probe electrodes supported by a supporting member, and steps of bringing a sample in confrontation with and in proximity to the probe electrodes such that tunnel current flows, and measuring and compensating variation of the distance between the supporting member and the sample.

According to an another further aspect of the present invention, there is provided a recording/reproducing device comprising at least two probe electrodes supported by a supporting member, a means for placing a recording medium in proximity to the probe electrodes, a means for applying voltage between the probe electrodes and the recording medium, at least one of the probe electrodes being provided with a mechanism for measuring and compensating variation of the distance between the supporting member and the recording medium.

DETAILED DESCRIPTION OF THE PREFERRED EMBODIMENTS

The present invention relates to a scanning tunnel-current-detecting device comprising a second probe electrode (a position-controlling tip) provided separately from a first probe electrode for observation, and a variation-compensating mechanism constituted of a feedback servo circuit which detects a variation of the member constituting STM and the sample to be measured caused by a temperature drift from the change of a tunnel current flowing between the second probe electrode and an electroconductive sample, and which drives a fine variation-compensating device in accordance with the signal of detection.

The Examples below describe the constitution of the present invention in detail.

EXAMPLE 1

Figure 1:
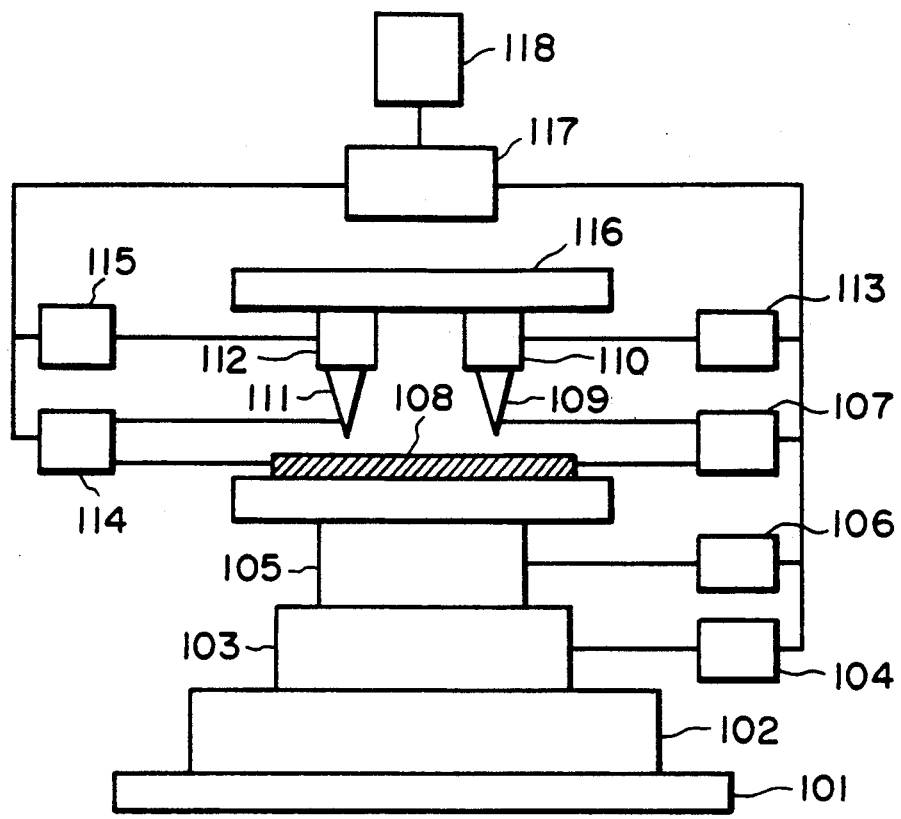
FIG. 1 illustrates a block diagram of an STM provided with a mechanism for compensating variation caused by thermal drifts and mechanical vibrations.

FIG. 1 shows a block diagram of an STM comprising a variation compensating mechanism of a preferred embodiment of the present invention.

The whole device is mounted on vibration-damping member 101 having a relatively large mass so that a vibration of high frequency from external disturbance can be intercepted.

The relative positions of position-controlling tip 109 and observation tip 111 to electroconductive sample 108 can be chosen as desired by means of XY stage 102 within a plane (XY) direction and coarse adjusting mechanism 103 within a height (Z) direction. The numeral 104 denotes a driving circuit for driving coarse adjusting mechanism 103. Observation tip 111 is capable of scanning within a plane direction with a constant tunnel current maintained by cylindrical observation piezo-element 112, where the positional variation of cylindrical observation piezo-element 112 in the Z direction corresponds to the surface state of electroconductive sample 108. Current amplifier 114 amplifies the tunnel current flowing between observation tip 111 and electroconductive sample 108. Servo circuit 115 serves to drive cylindrical observation piezo-element 112 in the Z direction so as to keep the tunnel current constant when observation tip 111 scans.

Cylindrical observation piezo-element 112 for driving observation tip 111 is integrated through piezo-element supporting member 116 with position-controlling piezo-element 110 for driving position-controlling tip 109 as shown in FIG. 1.

While the surface is observed by scanning the surface of electroconductive sample 108 with observation tip 111, the tunnel current is measured at a specified position of electroconductive sample 108 by position-controlling tip 109.

This tunnel current will vary on receiving an external disturbance such as vibration. Accordingly, variations caused by thermal drifts, vibrations, etc. can be cancelled mechanically by driving fine variation-compensating mechanism 105 in the Z direction by moving electroconductive sample 108 through position-controlling servo circuit 106.

Different from the above-mentioned mechanical correction, other correction methods also are feasible in which the variation read by position-controlling tip 109 is subtracted from the observed value read by observation tip 111 on the basis of data analysis with microcomputer 117.

These methods enable observation without an influence of minute deformation of the construction material caused by an external vibration or an environmental change when observation tip 111 scans on the sample.

Incidentally, position-controlling piezo element 110 is employed for setting preliminarily the suitable tunnel current value for controlling thermal drifts, etc. by deciding the position of position-controlling tip 109 in the Z direction before beginning the surface observation, and the preliminarily set driving voltage is kept constant during the observation.

The numeral 113 is a circuit for driving position-controlling piezo element 110, and the numeral 107 is a current amplifier for amplifying a tunnel current flowing between tip 109 and sample 108.

The devices described above are respectively controlled by central microcomputer 117. And the numeral 118 denotes a display instrument.

The tunnel current at a specified position was measured by observation tip 111, ten times with the feed back system of the present invention employed against thermal drift and vibration, etc.; and ten times without employing the above feedback system for comparison. The operation of the feed back system was found to reduce the variation caused by the temperature drift to 1/100 or less of the case without employing the feedback system, by which the effect of the present invention was confirmed.

EXAMPLE 2

Figure 2:
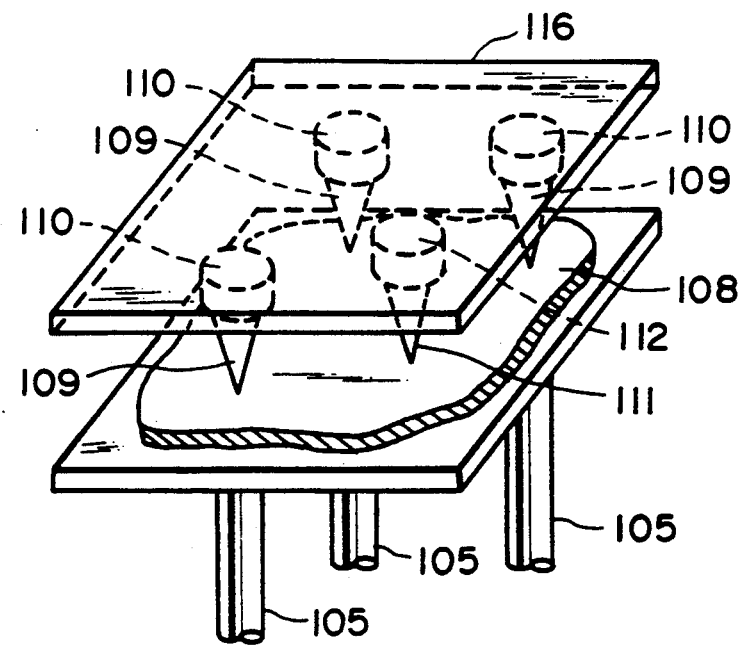
FIG. 2 is a perspective view of the STM with emphasis of the sample for explaining Example 2.

Another example is shown below. As shown in FIG. 2, use of position-controlling tip 109 and three sets of fine variation-compensating mechanism 105 for leveling the sample surface before the observation of the electroconductive sample enabled the maintenance of the leveling during the observation.

A graphite surface was observed with this device to obtain satisfactory data.

EXAMPLE 3

The device of the present invention as used for a recording/reproducing apparatus is shown below.

The constitution of the recording/reproducing apparatus is basically similar to the block diagram shown in FIG. 1. A recording medium, having provided with a recording layer partially on the graphite, was used as sample 108. Such the recording medium was so fabricated that the recording layer was positioned under probe electrode 111 and the surface of graphite was positioned under probe 109.

An LB layer (one layer) of squarilium-bis-6-octylazulene was used as a recording layer. The LB layer was made according to a method of JP Laid-Open No. 63-161,552.

Recording/reproducing was carried out as follows: The probe voltage of 1.0 V was applied between probe electrode 109 and the graphite, and the distance (Z) between probe electrode 109 and the graphite surface was so adjusted that the probe current (Ip) at a specified position was made $10^{-9}$ A by means of fine variation-compensating mechanism 105.

Then, (+) was applied on probe electrode 111, (−) was applied on the graphite, and a rectangular pulse voltage more than threshold voltage $V_{th.ON}$ to change a recording layer to a low resistance conditions (ON conditions) was applied to cause the ON conditions. Keeping the distance (Z) between probe electrode 111 and the graphite, a probe voltage 1.0 V was applied between probe electrode 111 and the graphite, and probe current (Ip) was measured. It was confirmed to be the ON conditions by detecting a current of about 0.5 mA.

Upon setting the probe voltage of 10 V, which was more than threshold voltage $V_{th.OFF}$, to change a recording layer from the ON to the OFF conditions and applying it again at the recording position, the recording conditions were erased and it was confirmed to be transferred to the OFF conditions.

In carrying out the recording/reproducing, variations caused by thermal drifts, vibrations, etc. could be cancelled by driving fine variation-compensating mechanism 105 by means of position-controlling servo circuit 106, keeping the tunnel current constant, by measuring the tunnel current flowing between probe electrode 109 and the graphite surface.

As described above, the STM provided with a mechanism for removing variation caused by thermal drifts and mechanical vibrations can be exempted, in observation, from the influence of vibration of an angstrom order and a minute deformation of the construction material caused by temperature change.

The device of the present invention may preferably used for a tunnelling current detecting device other than a tunnel microscope, such as a recording-reproducing apparatus and the like.

We claim:

1. A method for recording an information into a recording medium by means of a probe electrode in proximity to the recording medium, comprising using a first probe electrode and a second probe electrode, which can be driven independently, supported by a supporting member, and recording an information into said recording medium by means of said first probe electrode, while compensating deviation of a distance between said first probe electrode and said recording medium by adjusting a distance between said recording medium and said supporting member so as to keep substantially constant a current flowing between said second probe electrode and said recording medium.

2. The method for recording an information according to claim 1, wherein said first probe electrode is connected with said supporting member through driving means for driving said first probe electrode.

3. The method for recording an information according to claim 2, wherein said driving means is a piezo element.

4. The method for recording an information according to claim 1, wherein said second probe electrode is kept at a specified position above said recording medium.

5. The method for recording an information according to claim 1, wherein said recording medium has a recording layer on the surface.

6. The method for recording an information according to claim 1, wherein said recording is carried out by applying a pulse voltage exceeding a threshold voltage for changing an electric resistance of said recording medium, from said first probe electrode to said recording medium.

7. A method for reproducing a recorded information by means of a probe electrode in proximity to a recording medium comprising using a first probe electrode and a second probe electrode, which can be driven independently, supported by a supporting member, and reproducing said information from said recording medium by means of said first probe electrode, while compensating deviation of a distance between said first probe electrode and said recording medium by adjusting a distance between said recording medium and said supporting member so as to keep substantially constant a current flowing between said second probe electrode and said recording medium.

8. The method for reproducing an information according to claim 7, wherein said first probe electrode is connected with said supporting member through driving means for driving said first probe electrode.

9. The method for reproducing an information according to claim 8, wherein said driving means is a piezo element.

10. The method for reproducing an information according to claim 7, wherein said second probe electrode is kept at a specified position above said recording medium.

11. The method for reproducing an information according to claim 7, wherein said recording medium has a recording layer on the surface.

12. The method for reproducing an information according to claim 7, wherein said reproducing is carried out by detecting a current flowing between said first probe electrode and said recording medium.

13. A method for erasing a recorded information by means of a probe electrode in proximity to a recording medium comprising using a first probe electrode and a second probe electrode, which can be driven independently, supported by a supporting member, and erasing said recorded information by means of said first probe electrode, while compensating deviation of a distance between said first probe electrode and said recording medium by adjusting a distance between said recording medium and said supporting member so as to keep substantially constant a current flowing between said second probe electrode and said recording medium.

14. The method for erasing a recorded information according to claim 13, wherein said first probe electrode is connected with said supporting member through driving means for driving said first probe electrode.

15. The method for erasing a recorded information according to claim 14, wherein said driving means is a piezo element.

16. The method for erasing a recorded information according to claim 13, wherein said second probe electrode is kept at a specified position above said recording medium.

17. The method for erasing a recorded information according to claim 13, wherein said recording medium has a recording layer on the surface.

18. The method for erasing a recorded information according to claim 13, wherein said erasing of a recorded information is carried out by applying a pulse voltage exceeding a threshold voltage for changing an electric resistance of said recording medium, from said first probe electrode to said recording medium.

19. A method for recording an information into a recording medium by means of a probe electrode in proximity to a recording medium, comprising using at least four probe electrodes, which can be driven independently, supported by a supporting member, and recording an information into said recording medium by means of the fourth probe electrode, while adjusting a distance between a surface of said recording medium and said supporting member so as to keep nearly constant each current flowing between said first to third probe electrodes and said recording medium, respectively.

20. The method for recording an information according to claim 19, wherein said recording medium surface and said supporting member are kept horizontal, by adjusting a distance between said recording medium surface and said supporting member.

21. The method for recording an information according to claim 19, wherein said fourth probe electrode is connected with said supporting member through a driving means for driving said fourth probe electrode.

22. The method for recording an information according to claim 21, wherein said driving means is a piezo element.

23. The method for recording an information according to claim 19, wherein said first to third probe electrodes are kept at specified positions above said recording medium.

24. The method for recording an information according to claim 19, wherein said recording medium has a recording layer on the surface.

25. The method for recording an information according to claim 19, wherein said recording of an information is carried out by applying a pulse voltage exceeding a threshold voltage for changing an electric resistance of said recording medium, from said fourth probe electrode to said recording medium.

26. A method for reproducing a recorded information by means of a probe electrode in proximity to a recording medium, comprising using at least four probe electrodes, which can be driven independently, supported by a supporting member, and reproducing said information in said recording medium by means of the fourth probe electrode, while adjusting a distance between a surface of said recording medium and said supporting member so as to keep substantially constant each current flowing between said first to third probe electrodes and said recording medium, respectively.

27. The method for reproducing an information according to claim 26, wherein said recording medium and said supporting member are kept horizontal, by adjusting a distance between said recording medium and said supporting member.

28. The method for reproducing an information according to claim 26, wherein said fourth probe electrode is connected with said supporting member through a driving means for driving said fourth probe electrode.

29. The method for reproducing an information according to claim 28, wherein said driving means is a piezo element.

30. The method for reproducing an information according to claim 26, wherein said first to third probe electrodes are kept at specified positions above said recording medium.

31. The method for reproducing an information according to claim 26, wherein said recording medium has a recording layer on the surface.

32. The method for reproducing an information according to claim 26, wherein said reproducing an information is carried out by detecting a current flowing between said fourth probe electrode and said recording medium.

33. A method for erasing a recorded information by means of a probe electrode in proximity to a recording medium, comprising using at least four probe electrodes, which can be driven independently, supported by a supporting member, and erasing said information in said recording medium by means of the fourth probe electrode, while adjusting a distance between a surface of said recording medium and said supporting member so as to keep substantially constant each current flowing between said first to third probe electrodes and said recording medium, respectively.

34. The method for erasing an information according to claim 33, wherein said recording medium and said supporting member are kept horizontal, by adjusting a distance between said recording medium and said supporting member.

35. The method for erasing an information according to claim 33, wherein said fourth probe electrode is connected with said supporting member through a driving means for driving said fourth probe electrode.

36. The method for erasing an information according to claim 35, wherein said driving means is a piezo element.

37. The method for erasing an information according to claim 33, wherein said first to third probe electrodes are kept at specified positions above said recording medium.

38. The method for erasing an information according to claim 33, wherein said recording medium has a recording layer on the surface.

39. The method for erasing an information according to claim 33, wherein said erasing of an information is carried out by applying a pulse voltage exceeding a threshold voltage for changing an electric resistance of said recording medium, from said fourth electrode to said recording medium.

40. An information detecting device for detecting an information by means of a probe electrode in proximity to a sample surface, comprising at least four probe electrodes, which can be driven independently, supported by a supporting member, and provided with a means for adjusting a distance between said sample surface and said supporting member so as to keep substantially constant each current flowing between said first to third probe electrodes and said sample surface, respectively, and keeping said sample surface and said supporting member horizontal, and a driving means for driving said fourth probe electrode.

41. A recording/reproducing device for recording an information into a recording medium and/or for reproducing or erasing a recorded information by means of a probe electrode in proximity to a recording medium, comprising at least four probe electrodes, which can be driven independently, supported by a supporting member, and provided with a means for adjusting a distance between said recording medium and said supporting member so as to keep substantially constant each current flowing between said first to third probe electrodes and said recording medium, respectively, and keeping said recording medium and a supporting member horizontal, and a driving means for driving said fourth probe electrode.

42. The recording/reproducing device according to claim 41, wherein said fourth probe electrode is connected with said supporting member through said driving means for driving said fourth probe electrode.

43. The recording/reproducing device according to claim 41, wherein said driving means is a piezo element.

44. The recording/reproducing device according to claim 41, wherein said first to third probe electrodes are kept at specified positions above said recording medium.

* * * * *

UNITED STATES PATENT AND TRADEMARK OFFICE
CERTIFICATE OF CORRECTION

PATENT NO. : 5,220,555

DATED : June 15, 1993

INVENTOR(S) : YOSHIHIRO YANAGISAWA ET AL.   Page 1 of 2

It is certified that error appears in the above-identified patent and that said Letters Patent is hereby corrected as shown below:

ON THE TITLE PAGE:

AT [56] REFERENCES CITED

U.S. Patent Documents, "4,481,616  11/1987  Matey" should read --4,481,616  11/1984  Matey--.

Other Publications, "Helvatica" should read --Helvetica--.

COLUMN 1

Line 47, "the whole" should read --all the--.

COLUMN 4

Line 45, "having" should read --having been--.
Line 47, "Such the" should read --The--.
Line 65, "a" should be deleted.

UNITED STATES PATENT AND TRADEMARK OFFICE
CERTIFICATE OF CORRECTION

PATENT NO.   : 5,220,555
DATED        : June 15, 1993
INVENTOR(S)  : YOSHIHIRO YANAGISAWA ET AL.    Page 2 of 2

It is certified that error appears in the above-identified patent and that said Letters Patent is hereby corrected as shown below:

<u>COLUMN 5</u>

Line 25, "used" should read --be used--.

Signed and Sealed this

Eighth Day of March, 1994

Attest:

BRUCE LEHMAN

Attesting Officer          Commissioner of Patents and Trademarks